United States Patent [19]
Dudley et al.

[11] 3,807,841
[45] Apr. 30, 1974

[54] DOOR ASSEMBLY FOR A MOTION PICTURE CAMERA

[75] Inventors: Harvey Harmon Dudley, Penfield; Robert Irving Gresens, Rochester, both of N.J.

[73] Assignee: Eastman Kodak Company, Rochester, N.Y.

[22] Filed: Feb. 28, 1973

[21] Appl. No.: 336,863

[52] U.S. Cl..................... 352/75, 352/72, 352/242, 95/31 CA
[51] Int. Cl. ............................................. G03b 23/02
[58] Field of Search ......... 352/72, 75, 78, 242, 244; 95/31 CA, 11 R; 292/34

[56] References Cited
UNITED STATES PATENTS

| | | | |
|---|---|---|---|
| 2,728,263 | 12/1955 | Schmitt et al........................ | 352/76 |
| 2,681,600 | 6/1954 | Heidecke............................ | 95/11 R |
| 3,017,804 | 1/1962 | Bonisch et al. ..................... | 352/72 |
| 3,627,227 | 12/1971 | Foor .................................... | 352/75 |
| 2,216,909 | 10/1940 | Foster................................. | 352/75 |
| 3,488,112 | 1/1970 | Hickl .................................. | 352/72 |
| 3,259,410 | 7/1966 | Neudecker et al. ................. | 95/11 X |

*Primary Examiner*—Samuel S. Matthews
*Assistant Examiner*—Alan Mathews
*Attorney, Agent, or Firm*—John A. Morrow

[57] ABSTRACT

A motion picture camera includes a cartridge chamber for receiving various sizes of film cartridges which support a film strip in the cartridge chamber, the film strip in at least one of the cartridges being capable of having sound and images simultaneously recorded onto the film strip. The cartridge chamber is partially defined by a cover or door assembly which is movably secured to the camera permitting access to the chamber such that at least a portion of the various sizes of film cartridges can be readily inserted into or removed from the cartridge chamber. In the preferred embodiment, the cover or door assembly includes a hinged section which (1) can be positioned so as to entirely enclose the cartridge chamber around smaller cartridges which are received therein, or (2) can be positioned in an open position wherein it is maintained along the outer periphery of a larger cartridge which is only partially received in the cartridge chamber of the camera. The door assembly also includes suitable resilient projections for cooperating with either the body of the camera or the body of the larger film cartridges to insure that the cartridge compartment is maintained in a light tight condition when any of the various sizes of the film cartridges are positioned in the cartridge chamber of the camera.

16 Claims, 11 Drawing Figures

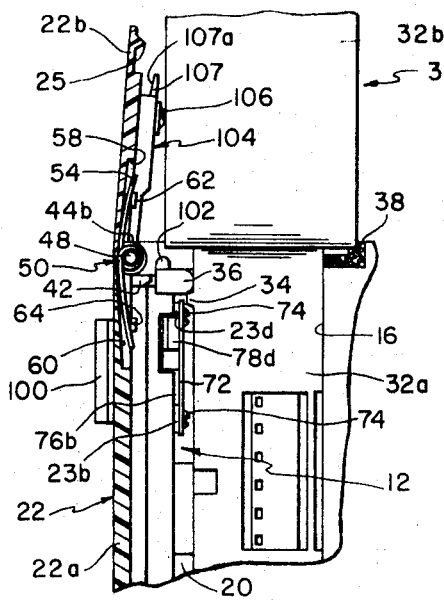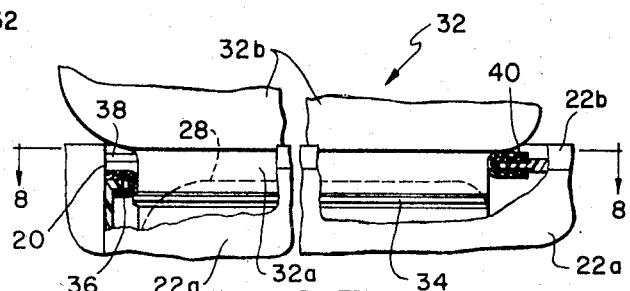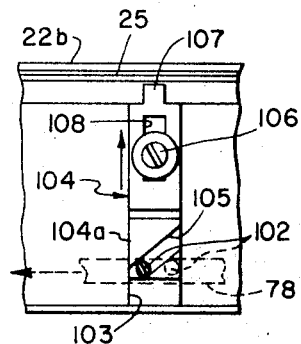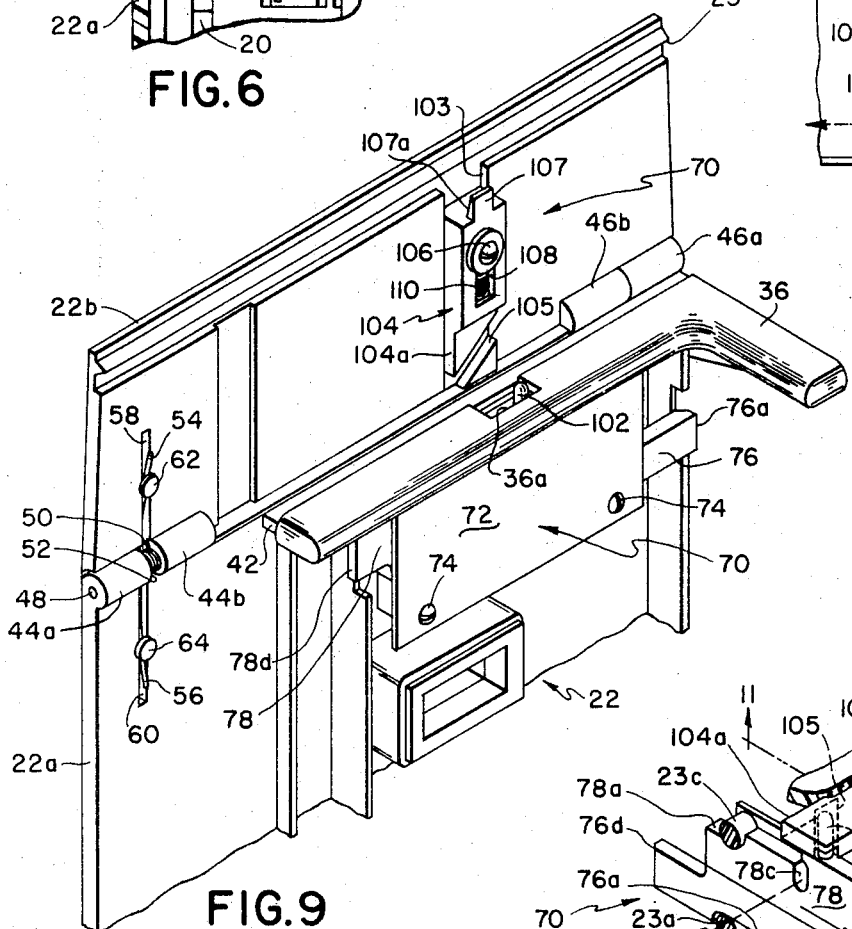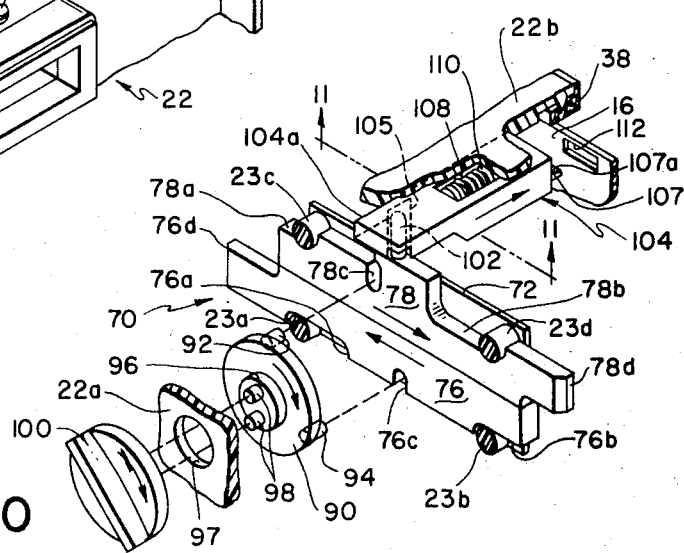

DOOR ASSEMBLY FOR A MOTION PICTURE CAMERA

CROSS-REFERENCE TO RELATED APPLICATIONS

Reference is made to commonly assigned copending U.S. Pat. application Ser. No. 333,588, entitled, "SOUND MOTION PICTURE CAMERA," filed Feb. 20, 1973, in the name of Kosarko et al.; U.S. Pat. application Ser. No. 291,135, entitled, "SHROUD FOR SOUND MOTION PICTURE CAMERA," filed Sept. 21, 1972 in the name of Kasarko; U.S. Pat. application Ser. No. 256,552, entitled, "FILM CARTRIDGE WITH GUIDE FINGER," filed May 24, 1972 in the name of Kosarko; U.S. Pat. application Ser. No. 248,513, entitled "FILM CARTRIDGE" filed Apr. 28, 1972 in the name of Kosarko et al.; and U.S. Pat. application Ser. No. 114,125, entitled, DESIGN FOR FILM CARTRIDGE, filed Oct. 30, 1973, in the name of Dudley et al.

BACKGROUND OF THE INVENTION

1. Field Of The Invention

This invention relates to motion picture cameras adapted for use with various sizes of film cartridges and more particularly to a cover or door assembly for maintaining the cartridge chamber of a camera light-tight by cooperating with either the body of the camera or with the body or housing of a received film cartridge.

2. Description Of The Prior Art

It is known to construct motion picture cameras suitable for use with varying sizes of film cartridges which contain different film lengths. For example, U.S. Pat. No. 2,184,331, issued to Becket et al. on Dec. 26, 1939, discloses a camera which is arranged to operate with either small or large film-containing cassettes attachable to the outside of the camera housing, and U.S. Pat. No. 3,017,804 issued to Bonish et al. on Jan. 23, 1962, which discloses a camera adapted to cooperate with an attachment which extends the length of the body of the camera to permit the camera to operate with longer film lengths.

To provide the necessary light-tight features for protecting the light sensitive film, the first mentioned prior art camera includes rather complicated and expensive threading arrangements. The latter camera requires the removal of a door member from the camera to permit a light-tight fit between the camera and the attachment which is in itself undesirable for the door of the camera or the attachment can become lost or damaged when not being used. Therefore, it is desirable to provide a camera of the type having a cover or door assembly which is secured to the camera in a manner suitable to enclose a light-tight chamber for protecting the sensitized film when cartridges of various sizes are used with the camera.

SUMMARY OF THE INVENTION

An object of the present invention is to provide an improved camera adapted to receive various film cartridges which may range from a small size which can be entirely enclosed in a cartridge chamber of the camera to a larger size which is only partially received in the cartridge chamber with a portion of the cartridge extending therefrom.

Another object of the invention is to provide a cover or door assembly which is movably secured to a camera, the door assembly being effective to enclose the cartridge chamber of the camera or to cooperate with a portion of a received cartridge having a portion extending beyond the camera chamber such that the cartridge chamber is maintained in a light-tight condition.

A further object of the present invention is to provide a camera having a cartridge chamber adapted to cooperate with a received cartridge to protect light-sensitive film carried by the cartridge, the camera including a cover which is hinged to the camera and is adapted to either enclose a cartridge in the cartridge chamber or to have a section of the cover swung away from the cartridge chamber to permit larger cartridges to extend partially out of the chamber.

In accordance with the present invention, a camera having a plurality of walls partially defining a cartridge chamber further includes an assembly supported by said camera for movement between, (1) a first position wherein said cartridge chamber is enclosed in a light-tight manner, and (2) a second position wherein a portion of a received cartridge which is not fully received into said cartridge chamber is permitted to extend beyond the walls, said assembly cooperating with the cartridge to enclose in a light-tight manner that portion of the cartridge which is received in said cartridge chamber.

The invention and its objects and advantages will become more apparent in the detailed description of the preferred embodiment presented below.

BRIEF DESCRIPTION OF THE DRAWINGS

In the detailed description of the preferred embodiment presented below, reference is made to the accompanying drawings in which:

FIG. 6 is a fragmentary, sectional view taken along line 6—6 of FIG. 5 showing how a portion of a sound film cartridge of the type shown in FIGS. 4 and 5 cooperates with a door assembly of the present invention, certain portions of the camera and cartridge being broken away or omitted;

FIG. 7 is a fragmentary elevation view showing (in solid) how a portion of a sound cartridge of the type shown in FIGS. 4 and 5 cooperates with certain features of the camera to obtain a light-tight fit, and showing (in phantom) how a sound cartridge of the type shown in FIGS. 2 and 3 would cooperate with the same features, certain portions of the camera and cartridge being broken away or omitted;

FIG. 9 is a fragmentary perspective view of the door assembly of the present invention for a motion picture camera as shown in FIG. 1, a portion of the door being broken away or omitted;

FIG. 10 is a fragmentary exploded view of a preferred embodiment of a latching mechanism of the type suitable for use with the door assembly shown in FIG. 9, certain portions of the camera and the door assembly being broken away or omitted to better illustrate the invention; and FIG. 11 is a fragmentary sectional view taken along line 11—11 of FIG. 10 showing in greater detail a portion of the latching mechanism, certain portions of the door assembly being broken away or omitted to better illustrate the invention.

DESCRIPTION OF THE PREFERRED EMBODIMENT

Figure 1:
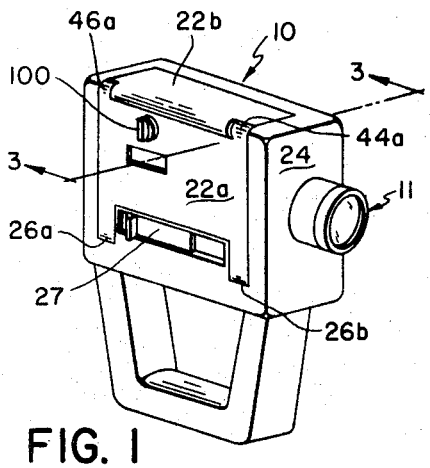
FIG. 1 is a perspective view of a sound motion picture camera incorporating a cover or door assembly of the present invention.

Because photographic apparatus are well known, the present description will be directed in particular to elements forming part of, or cooperating more directly with, the present invention, apparatus not specifically shown or described being understood to be selectable from those known in the art.

Referring now to the drawings, a motion picture camera 10 has a cartridge chamber 12 for receiving film cartridge which supports a film strip F along a predetermined film path. As illustrated by way of example, a cartridge chamber 12 is partially defined by walls 14, 16, 18 and 20 and by a cover or door assembly 22 comprising upper and lower sections 22a and 22b, respectively. Section 22a is hinged to the body or housing 24 of the camera 10 by hinges 26a and 26b. In the preferred embodiment, walls 14, 16 and 20 mate with the edges of the cover 22 to insure that the cartridge chamber 12 is light-tight whenever the cover 22 is in its closed (FIGS. 1 and 3) position. As is well known, a film claw (not shown) projects through wall 14 during movement along a generally rectilinear path for intermittently advancing frames of a film through the cartridge and past a camera exposure aperture (not shown) behind a lens assembly 11 for exposing scene images upon the film in a known manner. In the preferred embodiment, the motion picture camera 10 also includes suitable sound recording means (not shown) and guide means (not shown) located along a section of the film path which passes adjacent to wall 18. These means and the mechanism for controlling their movement relative to the film path have been described in greater detail in the aforementioned copending commonly assigned U.S. Pat. application Ser. No. 333,588, entitled, Sound Motion Picture Camera, filed Feb. 29, 1973 in the name of Kosarko et al.; and U.S. Pat. application Ser. No. 291,135, entitled, Shroud For Sound Motion Picture Camera, filed Sept. 21, 1972, in the name of Kosarko.

Figure 2:
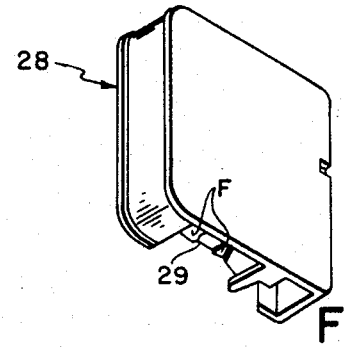
FIG. 2 is a perspective view of one type or size of sound film cartridge suitable for use with a camera as shown in FIG. 1.

As depicted in FIG. 2, a film cartridge especially suitable for use with the motion picture camera 10 is a "sound" film cartridge 28 which has been disclosed in more detail and commonly assigned copending U.S. Pat. application Ser. No. 256,552 entitled, "Film Cartridge With Guide Finger," filed May 24, 1972 in the name of Kosarko; and U.S. Pat. application Ser. No. 248,513, entitled, Film Cartridge, filed Apr. 28, 1972 in the name of Kosarko et al., which are herein incorporated by reference. Since this "sound" film cartridge includes many of the features of a somewhat smaller "silent" film cartridge disclosed in commonly assigned U.S. Pat. No. 3,208,686, entitled, Film Cartridge, issued in the name of Edwards et al. on Sept. 28, 1965, and since that type of film cartridge is also suitable for use with the preferred embodiment of the motion picture camera as well, the disclosure of that patent is also included herein by reference.

Figure 3:
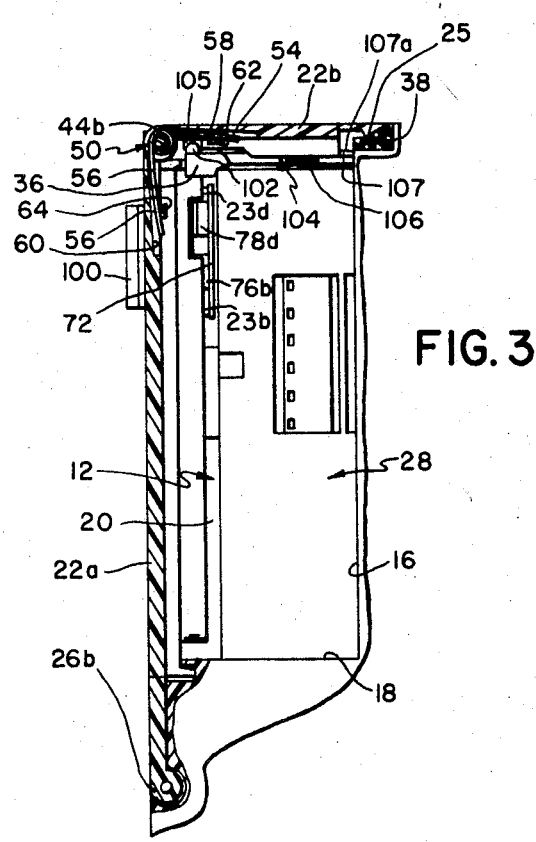
FIG. 3 is a fragmentary sectional view taken along line 3—3 of FIG. 1 showing how a sound film cartridge of the type shown in FIG. 2 is enclosed in the cartridge chamber of the camera by the cover or door assembly of the present invention, certain portions of the camera being broken or omitted.

Referring now to FIG. 3, a sound film cartridge 28 of the type shown in FIG. 2 is shown positioned in the cartridge chamber 12 of the movie camera 10 wherein the film strip supported thereby cooperates with the sound means and guide means which are nestled within an aperture 29 of the cartridge. When sound cartridge 28 or a silent cartridge (not shown) is properly positioned in the cartridge chamber 12, sections 22a and 22b of cover 22 close over the cartridge 28 and as will be explained later, the sections are latched into the closed (FIGS. 1 and 3) position by a suitable latching means. The latching of the door sections 22a and 22b in the closed position is effective to maintain the cartridge chamber 12 in a light-tight condition wherein sound and images can be simultaneously recorded onto the film by the motion picture camera 10.

Figure 4:
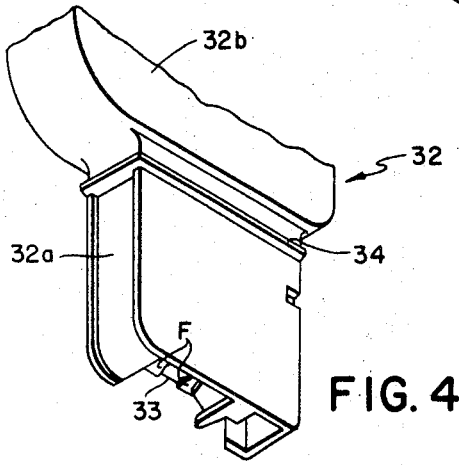
FIG. 4 is a fragmentary, perspective view of a portion of another type or size of sound film cartridge suitable for use in a camera as shown in FIG. 1.
Figure 5:
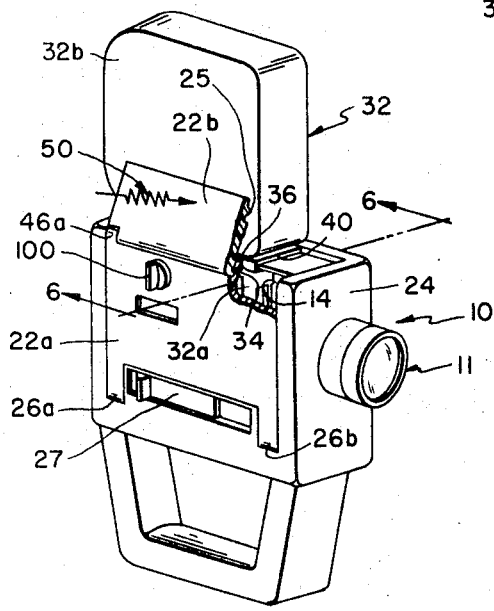
FIG. 5 is a perspective view similar to FIG. 1 showing the sound motion picture camera cooperating with a sound film cartridge of the type shown in FIG. 4.

Referring now to FIG. 4, the film cartridge 32 depicts the configuration of a film cartridge of the type disclosed in detail in the aforementioned commonly assigned copending U.S. Pat. application Ser. No. D114,125, entitled, Design For Film Cartridge, filed Oct. 30, 1973 in the name of Dudley et al. In a preferred embodiment, the cartridge 32 includes a portion 32a, which closely resembles in configuration and size a sound cartridge 28 as shown in FIG. 2 which has a capacity of about 50 feet of film. Cartridge 32 has an enlarged portion 32b which contains a supply chamber and a take-up chamber for a relatively long length of film (i.e., such as approximately 200 ft.). The film cartridge 32 is also adapted to cooperate with the motion picture camera 10 as shown in FIG. 5, wherein the lower portion 32a of the cartridge 32 is inserted into the cartridge chamber 12, with the sound recording means and the guide means of the motion picture camera 10 nestled in aperture 33 of the film cartridge 32. As shown in FIGS. 5 and 6, when the cartridge portion 32a is inserted in the cartridge chamber 12, the enlarged portion 32b extends beyond the upper surface of the cartridge chamber and also above housing 24 preventing the door 22 from entirely enclosing the cartridge chamber in the fashion shown in FIGS. 1 and 2. That is, as shown in FIGS. 5 and 6, the lower section 22a of the cover 22 is permitted to close to its normal closed (FIGS. 1 and 3) position but section 22b is restrained in an upright or vertical position by contact between the cartridge portion 32b and a portion of the latching mechanism 70. When a large film cartridge 32 is received in this position, it is contacted by resilient pad members 36, 38 and 40 which are urged into a cooperating position with the cartridge 32 to insure that the light sensitive film is maintained in the cartridge chamber 12 in a light-tight condition as will now be described.

Figure 8:
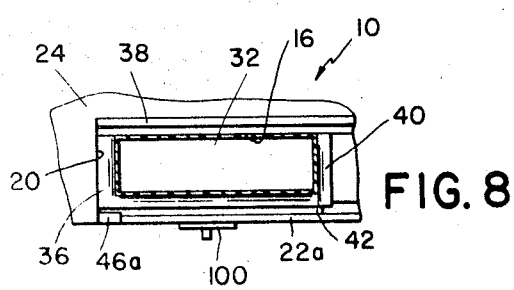
FIG. 8 is a fragmentary, sectional view taken along line 8—8 of FIG. 7 showing how a portion of the sound film cartridge cooperates with resilient members to maintain the chamber in a light-tight manner, certain portions of the camera and cartridge being broken away or omitted.

As best shown in FIGS. 8 and 9, an "L" shaped resilient pad 36 is supported by a mating "L" shaped rib 42 which is affixed to section 22a of the cover 22. The resilient pad 36 is positioned such that when section 22a is closed to its FIGS. 5 and 6 position, the pad 36 is resiliently deformed as it cooperates with a projecting rib 34 which extends along one side and the rear of the cartridge 32 (as shown in FIG. 4) and with the exterior walls of the cartridge 32 to insure that no light passes between the pad 36 and the cartridge 32. As shown in FIG. 8, one end of pad 36 is urged into resilient engagement with wall 16 when section 22a is closed and the end is also urged into engagement with one end of a resilient pad 38 to protect against passage of light into the cartridge chamber 12 between pad 36 and pad 38. As best shown in FIG. 6, a lower edge of portion 32b of the cartridge 32 nests with the resilient pad 38 and, as shown in FIG. 7, the resilient pad 40 cooperates with the front edge of the cartridge 32 at the junction of portions 32a and 32b and immediately below the contour of portion 32b to insure that light does not pass between the resilient pads 38 and 40 and the cartridge 32. Also, as depicted in FIG. 8, one end of pad 40 is positioned adjacent wall 16 and pad 38 and the other end extends into position to contact an end of the resilient pad 36. Thus, when the cover 22 is in the closed (FIGS. 5 and 6) position with the large sound cartridge 32 properly positioned in the cartridge chamber 12, the end portion 32a of the cartridge is maintained in the desired light-tight condition. It will be understood from the foregoing that because of the manner in which the portion 32a is enclosed, the size of portion 32b of the enlarged cartridge is not critical to the operation of the camera. Also, it should be noted that, as shown in phantom in FIG. 7, the resilient pads 36 and 40 are positioned above the upper surface of the smaller sound cartridge 28 while as shown in FIG. 3, the resilient pads 36 does contact the top edge of the cartridge 28 and serves to maintain the cartridge in the desired position within the cartridge chamber 12. The contact between the resilient pads 36 and 40 and a cartridge 28 is unnecessary as the cover section 22b encloses the chamber in a light-tight manner by engaging the mating wall portions and with the elongate rib member 25 on section 22b cooperating resilient pad 38 as shown in FIG. 3.

Referring now to FIG. 9, cover section 22b of the cover or door assembly 22 is secured to cover section 22a by hinge members 44a, 44b and 46a, 46b which are connected by hinge pins. A spring member 50 includes a coil portion 52 wrapped around the hinge pin 48 that connects hinge members 44a and 44b. The spring member 50 also includes end portions 54 and 56 which are secured in slots 58 and 60, respectively, by rivets 62 and 64, for example. In this position the spring member 50 is effective to urge the cover section 22b toward the closed (FIGS. 1 and 3) position. Thus, when the cover 22 is in the position shown in FIGS. 5 and 6, the cover section 22b is resiliently urged into contact with the side of portion 32b of the large sound cartridge 32.

As previously mentioned, a latching mechanism 70 is provided for latching cover sections 22a and 22b either in the FIG. 1 position or the FIG. 5 position. As depicted in FIGS. 9 and 10, a portion of latching mechanism 70 is partially enclosed by a plate 72 which is affixed to the door section 22a by screws 74 cooperating with studs or projections 23a, 23b affixed to section 22a of the cover 22. The plate 72 is effective to maintain latching arms 76 and 78 in position wherein projections 23a and 23b cooperate with elongate recesses 76a and 76b, respectively. Similarly, studs or projections 23c and 23d cooperate with elongate recesses 78a and 78b, respectively, as shown in FIG. 10. Latching arms 76 and 78 are thereby mounted for sliding movement relative to the projections and to each other.

The latching mechanism 70 further includes a crank member 90 which supports pins 92 and 94 in position to cooperate with the edges of elongate slots or openings 76c and 78c in latching arms 76 and 78, respectively, such that rotational movement of crank member 90 causes relative lateral movement of the latching arms 76 and 78 in opposite directions. Crank member 90 also includes a circular extension 96 which passes freely through, and is rotatably supported by, an opening 97 in the cover section 22. Pins 98 are affixed to the surface of extension 96 and are effective to support a knob 100 which is positioned on the outside of the camera where it is accessible to the operator. As indicated by the arrows in FIG. 10, a clockwise rotational movement of knob 100 by the operator is effective to move the latching arm 76 to the left and latching arm 78 to the right to engage the housing 24 to latch section 22a in its closed position. It should be noted that the ends of the latching arms 76 and 78 include tapered portions 76d and 78d, respectively, for insuring that the latching arms engage the housing 24 properly and for urging the door section 22 into a light-tight seal as the latch arms are moved to their fully extended position. As the knob 100 is rotated in the counterclockwise direction by the operator, the latch arms again are returned to their FIGS. 9 and 10 retracted position so that the door section 22a can be opened.

A pin or cam 102 is secured to an upper edge of latching arm 78 for cooperating with another portion of the latching mechanism 70 which is secured to the cover section 22b. As shown in FIG. 9, a latching arm 104 is slidably secured in a recess 103 in the cover section 22b by fastening means such as a screw 106. The latching member is urged toward a retracted (FIG. 9) position by a spring member 110 which is positioned in the elongate opening 108 in the latching member 104. At end 104a of the latching member 104 is a recess or cam surface 105 which is angularly inclined relative to the direction of travel the latching member 104. Recess or cam surface 105 cooperates with pin or cam 102 for moving latching member 104 to an extended (FIG. 11) position as will now be described.

When cover section 22b is positioned in the closed (FIGS. 1 and 3) position (i.e., substantially perpendicular to section 22a) and the arm 78 is moved laterally as previously described, the latch member 104 is movable along slot 103 in cover section 22b either by the pin or cam and/or the resilient urging of spring 110. When latch member 104 is driven by pin 102 toward the extended (FIG. 11) position, a tapered surface 107a of a tab portion 107 of the latch member is driven into an opening 112 (FIG. 10) in the wall 16 to urge the cover section 22b into light-tight engagement with resilient pad 38 as shown in FIG. 3. It should be noted that, as shown in FIG. 9, the pin 102 which passes through the elongate opening 36a in resilient pad 36 is disengaged from slot 105 when the cover section 22b is in its raised (FIGS. 5, 6 and 8) position and the latching member 104 remain retracted under the urging of spring 108. Also, it should be noted from the foregoing that latching arms 76 and 78 are movable in response to the rotational movement of knob 100 when the cover section 22b is positioned for cooperation with either a film cartridge 28 or a large cartridge 32.

The invention has been described in detail with particular reference to a preferred embodiment thereof, but it will be understood that variations and modifications can be effected within the spirit and scope of the invention.

We claim:

1. A camera including a plurality of walls defining a portion of a cartridge chamber adapted to receive either (1) a first cartridge of a predetermined size or (2) a second cartridge of a larger size having a first portion and second portion, each of said cartridges being adapted to support a film strip in the camera, said camera comprising:
   a cover assembly supported by said camera for movement between, (1) a first position wherein said first cartridge is completely received in said cartridge chamber and said cover assembly cooperates with portions of said plurality of walls to completely enclose said first cartridge in said chamber in a light-tight manner, and (2) a second position wherein the first portion of the second cartridge is received into said cartridge chamber and the second portion of the second cartridge extends beyond said chamber, and
   a plurality of resilient pads supported by said walls and by said cover assembly and positionable in said chamber for cooperating with the second cartridge to enclose said first portion thereof in the chamber in a light-tight manner.

2. A camera as set forth in claim 1 wherein said cover assembly comprises a hinge mounting said assembly for movement to a third position wherein said cartridge or said first portion of said cartridge can be readily inserted into or removed from said cartridge chamber.

3. A camera as set forth in claim 1 further comprising a latch means cooperating with said cover assembly for latching said assembly in said first and second positions.

4. A motion picture camera including a door assembly for enclosing a cartridge chamber of the camera when a film cartridge is at least partially received in said chamber, said assembly comprising:
   a. a first section movably mounted to said camera, said first section being movable between (1) a first position wherein said first section is positioned adjacent to said cartridge chamber, and (2) a second position wherein said first section is inclined away from said cartridge chamber;
   b. a second section pivotally mounted to said first section, said second section movable when said first section is in said first position between (1) a first position wherein said second section is adjacent to said cartridge chamber, and (2) a second position inclined away from said cartridge chamber; and
   c. resilient means supported by said first section for cooperating with a portion of said cartridge which is received in said cartridge chamber to maintain said chamber in a light-tight condition if a portion of said cartridge extends from said chamber.

5. A motion picture camera as set forth in claim 4 further comprising means for urging said second section from said second position toward said first position.

6. A motion picture camera as set forth in claim 4 further comprising latching means cooperating with said first section when its in its first position for latching said first section in said first position.

7. A motion picture camera as set forth in claim 6 wherein said latching means comprises means on said second section effective to latch said second section in said first position when said first section is latched in said first position.

8. A motion picture camera as set forth in claim 4 further comprising:
   a. first means slidably supported by said first section and movable between (1) a first position wherein said first means is effective to latch said first section in a position adjacent to said cartridge chamber, and (2) a second position wherein said first means is ineffective to latch said first section in said first position adjacent to said cartridge chamber; and
   b. second means slidably supported by said second section and movable between (1) a first position wherein said second means is effective to latch said second section in a position adjacent to said cartridge chamber, and (2) a second position wherein said second means is ineffective to latch said second section in said first position adjacent to said cartridge chamber.

9. A motion picture camera as set forth in claim 8 further comprising means for coupling said first means to said second means when said second section is positioned in a plane substantially perpendicular to said first section so that said first means effects movement of said second means to its first position when said first means is moved to its first position.

10. A motion picture camera as set forth in claim 9 further comprising spring means adapted to resiliently urge said second means toward said second position.

11. A motion picture camera 9 wherein said first means includes a pin movable in a first direction and said second means includes a slot inclined to said first direction, a portion of said slot being positionable to receive said pin in a pin-and-slot relationship so that movement of said pin in a first direction is effective to impart movement to said second means in a second direction to move said second means between said first and second positions.

12. A motion picture comprising:
   a. a plurality of walls partially defining a cartridge chamber adapted to receive a cartridge which supports a film strip;
   b. a first member mounted to one of said plurality of walls for movement between (1) a closed position wherein said member further defines a portion of said cartridge chamber, and (2) an open position wherein said member is moved a spaced distance away from said cartridge chamber;
   c. a second member supported by said first member for movement between (1) a closed position wherein said member further defines a portion of said cartridge chamber, and (2) an open position wherein said member is moved a spaced distance away from said cartridge chamber;

d. first means for latching said first member in said closed position; and e. second means for latching said second member in said closed position, said second means being operatively coupled to said first means when said first and second members are in their respective closed positions such that movement of said first means to a position for latching said first member in said closed postion is effective to move said second means for latching said second member in said closed position.

13. A motion picture camera as set forth in claim 12 wherein said second means is disengageable from said first means in response to movement of said second means to its open position whereby latching of said first member in said closed position is ineffective to move said second means into position for latching said second member in its closed position.

14. A motion picture camera as set forth in claim 13 wherein said second means further comprises a resilient member urging said latching means from said position for latching said second member in said closed position.

15. A motion picture camera as set forth in claim 14 wherein said first means further comprises at least one arm which is slidably mounted to said first member, said arm being movable from (1) a first position wherein said arm is effective to engage a portion of said camera to latch said first member in said closed position, and (2) a second position wherein said arm is ineffective to engage said portion of said camera.

16. A motion picture camera as set forth in claim 15 wherein said first means further comprises a knob rotatably mounted to said first member and operatively coupled to said arm such that it is effective to move said arm between said first and said second position.

* * * * *